UNITED STATES PATENT OFFICE.

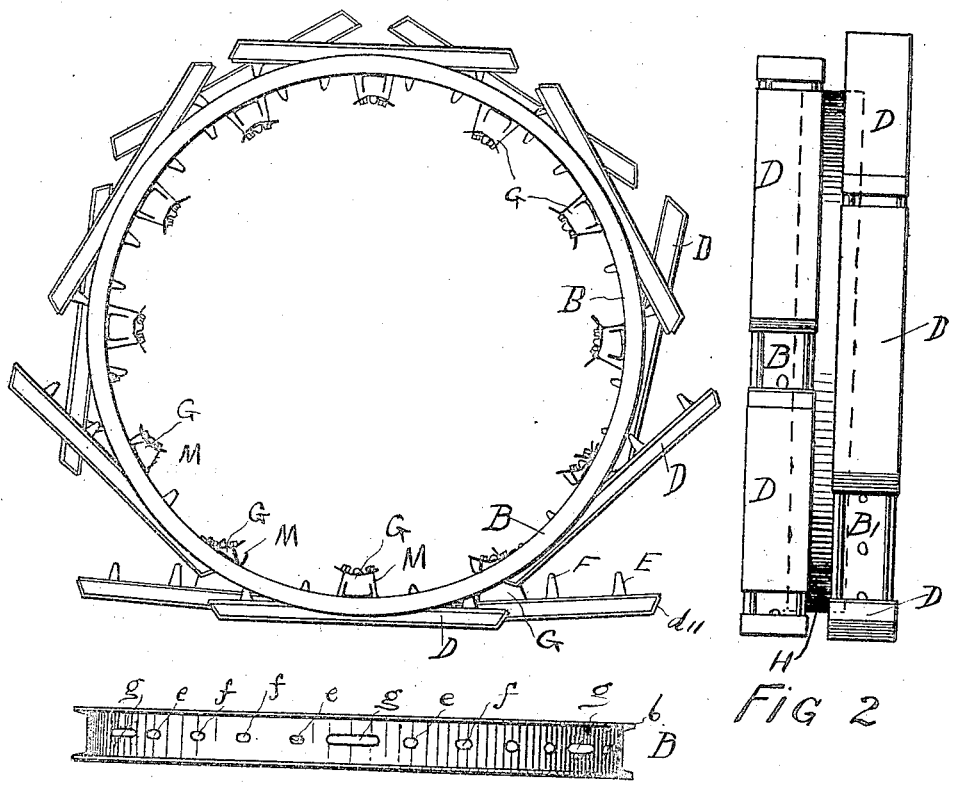
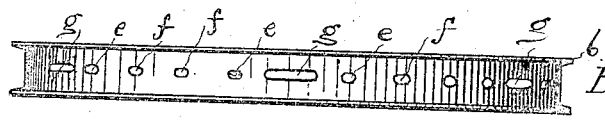
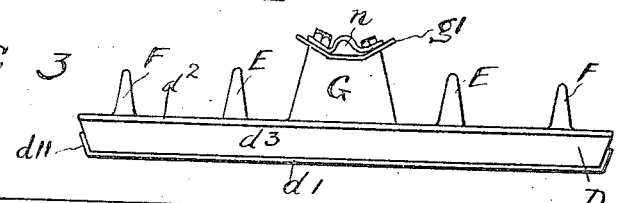
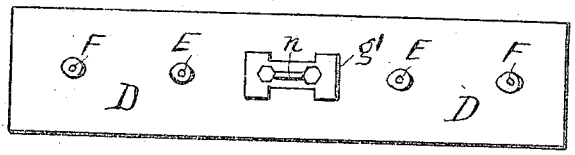

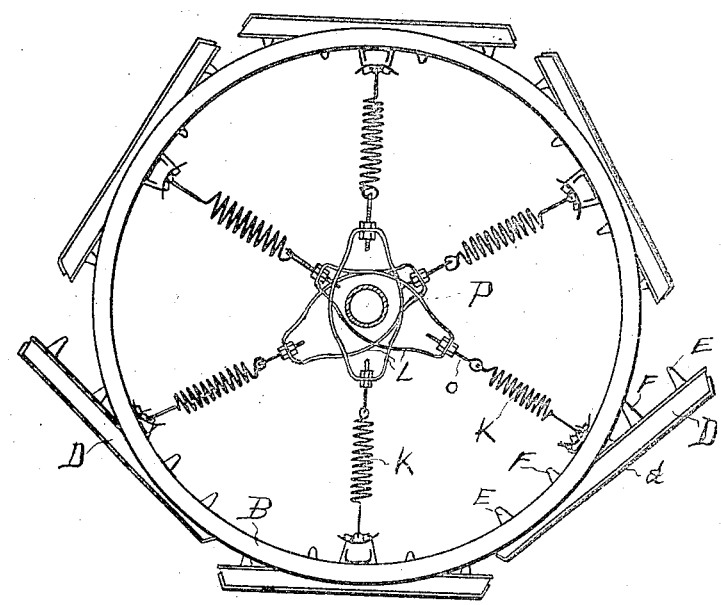
Fig. 6
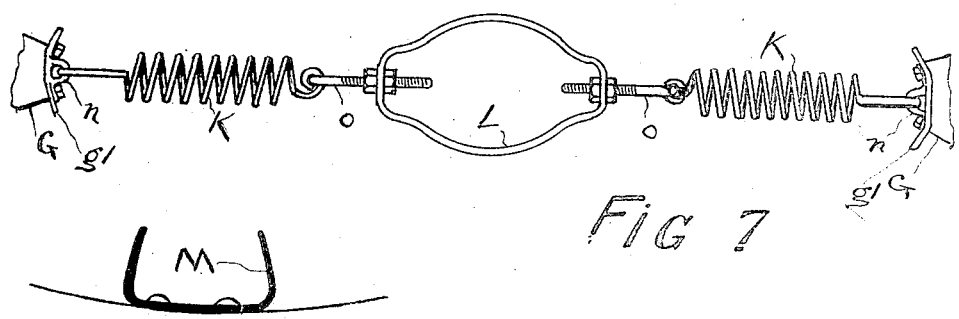
Fig 7
Fig 9
Fig 8

OTIS G. MALSBARY, OF PARLIER, CALIFORNIA.

TRACK-LAYING WHEEL.

1,353,256. Specification of Letters Patent. Patented Sept. 21, 1920.

Application filed May 20, 1918. Serial No. 235,504.

*To all whom it may concern:*

Be it known that I, OTIS G. MALSBARY, a citizen of the United States, and a resident of the town of Parlier, county of Fresno, and State of California, have invented a new and useful Improvement in Track-Laying Wheels, of which the following is a specification.

My invention relates to wheel rims constructed to carry the track upon which the wheel travels and among the objects accomplished are simplicity of construction, avoiding the use of pivots or hinges, the automatic alinement of the track whether the wheel is moving forward or backward and so that there is a continuous track with overlapping joints.

In the drawing accompanying this specification Figure 1 is a side view of the rim of the wheel and the track. Fig. 2 is a view of the periphery of the wheel showing the track as carried by it. Fig. 3 is a view of the periphery of the rim with the track removed. Fig. 4 is a side view of one of the units, or sections of the track. Fig. 5 is a top view of Fig. 4. Fig. 6 is a side view of a modified form of the wheel showing springs arranged to more readily hold the shoes in position. Fig. 7 is a detail view of the spring. Fig. 8 is a top view of a guide for alining the units of the track. Fig. 9 is a side view of Fig. 8.

In the said drawing H is an ordinary vehicle wheel. B and B¹ are duplicate auxiliary rims which are arranged in pairs, one on each side of wheel H to which they are rigidly attached. Any well known means may be used to attach the auxiliary rims to the wheel. Each of the rims B and B¹ have double outward flanges $r$ so the periphery is in the form of a channel. These flanges should be slightly beveled so the space between the flanges on each rim is slightly closer together at the base of the flange than at the outside thereof.

The rims have a plurality of oblong holes $g$ through the rim a spaced distance apart, as shown on the drawing, and a spaced distance from each of such oblong holes, and in line with the center of the periphery are a plurality of guide holes $e$ and $f$. The holes $g$, $e$ and $f$ should be alined. The rims B and B¹ should be constructed alike, but in attaching them to wheel H they should be arranged so holes $g$ on rim B will be on a line midway between any pair of holes $g$ on rim B¹. The purpose of this construction is hereinafter set forth.

D is a unit of the track. The number of said units is equal to the number of oblong holes $g$ in rims B and B¹.

Unit D consists of a block $d^3$ which is preferably of wood, rubber, or similar material which will absorb shocks more readily than iron, a base $d^2$, and a wearing shoe $d^1$. The base $d^2$ and shoe $d^1$ are preferably of metal. The shoe $d^1$ is intended to take the wear occasioned by the contact of the track with the ground, and the ends $d^{11}$ should be bent slightly upward to protect the block $d^3$. The width of the unit is such that it loosely fits in the channel between the flanges but the width of the shoe $d^1$ should be wider than the block $d^3$. G is an upright projection at the approximate center of base $d^2$ which fits loosely in the oblong hole $g$. This projection is tapered toward the top and is of such length and play within the hole $g$ that either end of the unit D can be moved to touch the periphery of the rim B or B¹. E and F are guide pins tapered toward the top, which fit loosely within the guide holes $e$ and $f$, for the purpose of alining the units of the track, when wheel 14 rotates, in the direction the wheel is traveling. The spaced distance between adjacent holes $g$ is such that when the wheel is assembled the adjacent ends of the units D on either of the rims B and B¹ will just meet so that when the wheel is rotating and the track drops in place on the ground it will form a continuous track, and the holes $g$ in the rims B and B¹ having the relation hereinbefore described the units on rim B¹ will overlap the meeting points of the units on rim B. $g^1$ is a stop plate attached to the top of projection G and is of such size that it locks the projection within the opening $g$ while permitting the unit to have the swinging motion heretofore described. Stop plate $g^1$ is cut in the form of an I. A guide M in the approximate form of a U having the upper ends approaching each other is attached to the inside of the rims B and B¹ in such relation that it will enter the opening on each side of $g^1$ and guide the unit.

In Fig. 6 I have shown a form of wheel heretofore described in which springs K are used to more readily adjust the units in the channel and to keep them from wabbling on the rim. When the springs K are used the units D should be arranged in pairs, the units composing each pair being on opposite sides of the rim. N is an eye on the top of projection G to which one end of spring K is attached. L is a ring which loosely encircles the hub P of the wheel, o is an eye-bolt attached to one end of spring K and running through the periphery of ring L. The tension of spring K can be adjusted by means of nuts $o^1$ and $o^2$ as shown in Fig. 7. If desired one end of the spring can be attached to the hub and the other end to the center of the unit.

I claim—

1. In a track laying wheel, the combination of duplicate rims attached to a common hub, each of said rims having an outwardly projecting flange on each side, a plurality of uniform sized units of track each of said units being of such width that it will fit loosely between the flanges on either rim, a projection at the approximate center of each unit adapted to pass through a hole in the rim, the shape of the projection and the shape of the hole being adapted to permit the unit of track to have a rocking lateral motion, means at the top of the projection adapted to keep it from falling through the hole in the rim, a plurality of upwardly projecting conical guides on each of said units, and holes in the rim adapted to register with and receive said conical projections, the units on each rim being arranged and spaced so that when lying on the ground the ends of contiguous units on each rim will meet, and the units on the duplicate rim will overlap the meeting place of the units on the other rim, substantially as described.

2. In a track laying wheel the combination of duplicate rims attached to a wheel, each of said rims having holes therethrough a spaced distance apart, units of track having upright tapering posts therein spaced to fit loosely within the holes, one of said posts being at the approximate center of said unit, the center post and the hole into which it fits being in such relation that the unit can be rocked so that either end thereof can touch the periphery of the wheel and means for holding said units in line consisting of an annular groove in the periphery of the rim of such width that the units will fit loosely therein, and guides attached to the inside circumference of the rim adjacent to the hole through which the center post on each unit extends, and adapted to limit the side play of such units, substantially as described.

OTIS G. MALSBARY.

Witnesses:
H. A. HUEBNER,
CLEO K. CURTIS.